(12) United States Patent
Lin et al.

(10) Patent No.: US 10,587,380 B2
(45) Date of Patent: Mar. 10, 2020

(54) FREQUENCY DIVERSITY MODULATION SYSTEM AND METHOD

(71) Applicant: TEXAS INSTRUMENTS INCORPORATED, Dallas, TX (US)

(72) Inventors: Jing Lin, Austin, TX (US); Tarkesh Pande, Richardson, TX (US); Il Han Kim, Allen, TX (US); Anuj Batra, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/268,050

(22) Filed: Feb. 5, 2019

(65) Prior Publication Data

US 2019/0173643 A1 Jun. 6, 2019

Related U.S. Application Data

(63) Continuation of application No. 15/651,132, filed on Jul. 17, 2017, now Pat. No. 10,200,171, which is a continuation of application No. 14/449,981, filed on Aug. 1, 2014, now Pat. No. 9,729,289.

(60) Provisional application No. 61/864,893, filed on Aug. 12, 2013.

(51) Int. Cl.
| | |
|---|---|
| *H04L 5/00* | (2006.01) |
| *H04W 28/04* | (2009.01) |
| *H04L 27/36* | (2006.01) |
| *H04L 27/20* | (2006.01) |
| *H04B 3/54* | (2006.01) |
| *H04W 72/12* | (2009.01) |

(52) U.S. Cl.
CPC ............. *H04L 5/0048* (2013.01); *H04B 3/54* (2013.01); *H04L 27/20* (2013.01); *H04L 27/36* (2013.01); *H04W 28/04* (2013.01); *H04W 72/1263* (2013.01); *H04B 2203/5408* (2013.01)

(58) Field of Classification Search
None
See application file for complete search history.

(56) References Cited

U.S. PATENT DOCUMENTS

| | | | |
|---|---|---|---|
| 6,115,427 A | * | 9/2000 | Calderbank ............ C07K 14/78 375/267 |
| 9,729,289 B2 | | 8/2017 | Lin et al. |
| 2004/0125882 A1 | | 7/2004 | Miyoshi |
| 2006/0104377 A1 | | 5/2006 | Chimitt et al. |
| 2007/0266343 A1 | | 11/2007 | Isoda |
| 2010/0008346 A1 | | 1/2010 | Shirakata et al. |
| 2010/0146363 A1 | * | 6/2010 | Birru .................... H04L 1/0043 714/752 |
| 2014/0153625 A1 | | 6/2014 | Vojcic et al. |

* cited by examiner

*Primary Examiner* — Angel T Brockman
(74) *Attorney, Agent, or Firm* — Brian D. Graham; Charles A. Brill; Frank D. Cimino

(57) ABSTRACT

A method of encoding a first bit and a second bit for transmission on a transmission band is provided. The method includes receiving a bit stream that includes the first and second bits, mapping the first bit into a first symbol, mapping the second bit into a second symbol, differentially encoding at least the first symbol and the second symbol, and causing the first and second symbols to be transmitted on a transmission band as part of a symbol stream.

16 Claims, 8 Drawing Sheets

FREQUENCY DIVERSITY MODULATION SYSTEM AND METHOD

CROSS-REFERENCE TO RELATED APPLICATIONS

The present application is a continuation of U.S. patent application Ser. No. 15/651,132 filed on Jul. 17, 2017 (now U.S. Pat. No. 10,200,171), which is a continuation of U.S. patent application Ser. No. 14/449,981 filed on Aug. 1, 2014 (now U.S. Pat. No. 9,729,289), which claims priority to U.S. Provisional Application No. 61/864,893 filed Aug. 12, 2013, the entireties of which are incorporated herein by reference.

BACKGROUND

The present invention is generally drawn to a system and method for modulating transmitted data to improve the robustness of power-line communications (PLC).

FIG. 1 illustrates a conventional power-line communications system 100.

As shown in the figure, system 100 includes an AC generator 101, a power transmission line 102, multiple power transmission line supports 104, a transmitter 110, communication signal transmission lines 112 and 116 and a receiver 114.

AC generator 101 is connected to power transmission line 102, which is supported by power transmission line supports 104. Transmitter 110 is connected to power transmission line by way of communication signal transmission line 112. Receiver 114 is connected to power transmission line 102 by way of communication signal transmission line 116.

AC generator 101 is operable to generate and distribute AC power through power transmission line 102 to users not shown. Transmitter 110 is operable to transmit a communication signal to power transmission line 102 through communication signal transmission line 112. Receiver 114 is operable to receive communication signal transmitted through power transmission line 102 by way of communications signal transmission line 116.

In operation, AC generator 101 generates electrical power to be distributed to users not shown by way of power transmission line 102, which is supported by multiple power transmission lines supports 104. Transmitter 110 generates a communication signal and transmits the signal by way of signal transmission line 112 to power transmission line 102. The communication signal is propagated by power transmission line 102 and delivered to receiver 114 by communication signal transmission line 116.

Primary impairments that limit communication performance of PLC include frequency selective channel, narrowband interference, and impulsive noise. Frequency selective channel impairments refer to signal distortions that are a function of a frequency within a channel in a communication line. Frequency selective channel impairments are based on attributes of the communication medium, e.g., the material of the power line in PLC systems and the different loads on the power-line. Narrowband interference is interference within a small portion of the band transmitted by the transmitter. For example, for purposes of discussion, suppose a transmitter is able to transmit in a band from 0 to 500 kHz. In such a transmission scheme, narrowband interference (NBI) may be interference with the band of 50 to 75 kHz. NBI may be due to the presence of legacy single carrier communication systems on the PLC network, e.g., spread-frequency shift keying (SFSK). Impulsive noise may be attributed to electrical devices within the power delivery system. All of these impairments may attenuate and/or delay data transmitted over a power line at different amounts based on the transmission frequency. These inconsistent attenuations and/or delays may cause errors in a received signal in PLC system.

Traditionally, repetition coding is used to improve the robustness of PLC in harsh channel and noise environments, at the price of decreased data rates. As an example IEEE P1901.2, ITU-T G9903 G3-PLC and ITU-T G9904 PRIME have modes like ROBO (Robust) mode and Super ROBO mode where the bit is repeated either 4 or 6 times. In this manner, even if one, or some, of the repeated bits are corrupted during transmission, there is an increased likelihood that one, or many others, of the repeated bits will be correctly received.

Dual carrier modulation (DCM) has been proposed to combat frequency selective channels in multi-band ultra-wideband (MB-UWB) wireless communication systems using Orthogonal Frequency Division Multiplexing (OFDM) for coherent systems. DCM maps four bits to two different 16-QAM symbols, which are allocated to two sub-bands that are separated by a fixed number of sub-bands. In case one of the two symbols is lost or unrecoverable, it is still possible to recover the four bits from the other symbol. The communication reliability is therefore improved. Using 16-QAM however entails that the system is a coherent system and pilots need to be sent in order to estimate the channel. In particular, the pilots are used to estimate the amplitude and phase of the frequency-selective channel. The channel estimation is then used by the receiver to compensate for amplitude and phase distortion imposed by the channel to subsequently received data. A disadvantage with coherent systems is that the introduction of pilots results in a loss of data rate as compared to a differential system.

What is needed is a modulation system and method that addresses impairments that limit communication performance of PLC and that does not decrease data rate as much as conventional systems and methods.

BRIEF SUMMARY

The present invention provides a modulation system and method that addresses impairments that limit communication performance of PLC and that does not decrease data rate as much as conventional systems and methods.

In accordance with aspects of the present invention, a method of encoding a first bit and a second bit for transmission on a transmission band is provided. The method includes: mapping, via a mapping component, the first bit and the second bit into a first symbol; mapping, via the mapping component, the first bit and the second bit into a second symbol; dividing, via a dividing component, the transmission band into subcarriers; allocating, via an allocating component, the first symbol to a first subcarrier of the subcarriers; allocating, via the allocating component, the second symbol to a second subcarrier of the subcarriers; and differentially encoding, via a differential encoder, the first symbol and the second symbol.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

An aspect of the present invention is drawn to differentially modulating a dual carrier modulation (DCM) for transmission through a PLC to alleviate receiver implementation complexity due to channel estimation. Another aspect of the present invention is drawn to a frequency diversity modulation for transmission through a PLC to reduce effects of transmission impairments of the transmission line as a function of frequency.

On a transmitter side of a PLC system, M bits of data to be transmitted are mapped to M symbols, within M sub-carriers. These M symbols may then be differentially modulated to create a differentially modulated string of symbols. This differentially modulated string of symbols may then be used to create an orthogonal frequency division multiplexing (OFDM) word for transmission through a power line to a receiver. The receiver, may then perform inverse transformations to decode the received data to obtain the original M bits of data.

Example embodiments, in accordance with aspects of the present invention, will now be described in greater detail with reference to FIGS. 2-9.

An example of a modulation scheme, in accordance with aspects of the present invention, will now be described in greater detail with reference to FIGS. 2 and 6.

Figure 2:
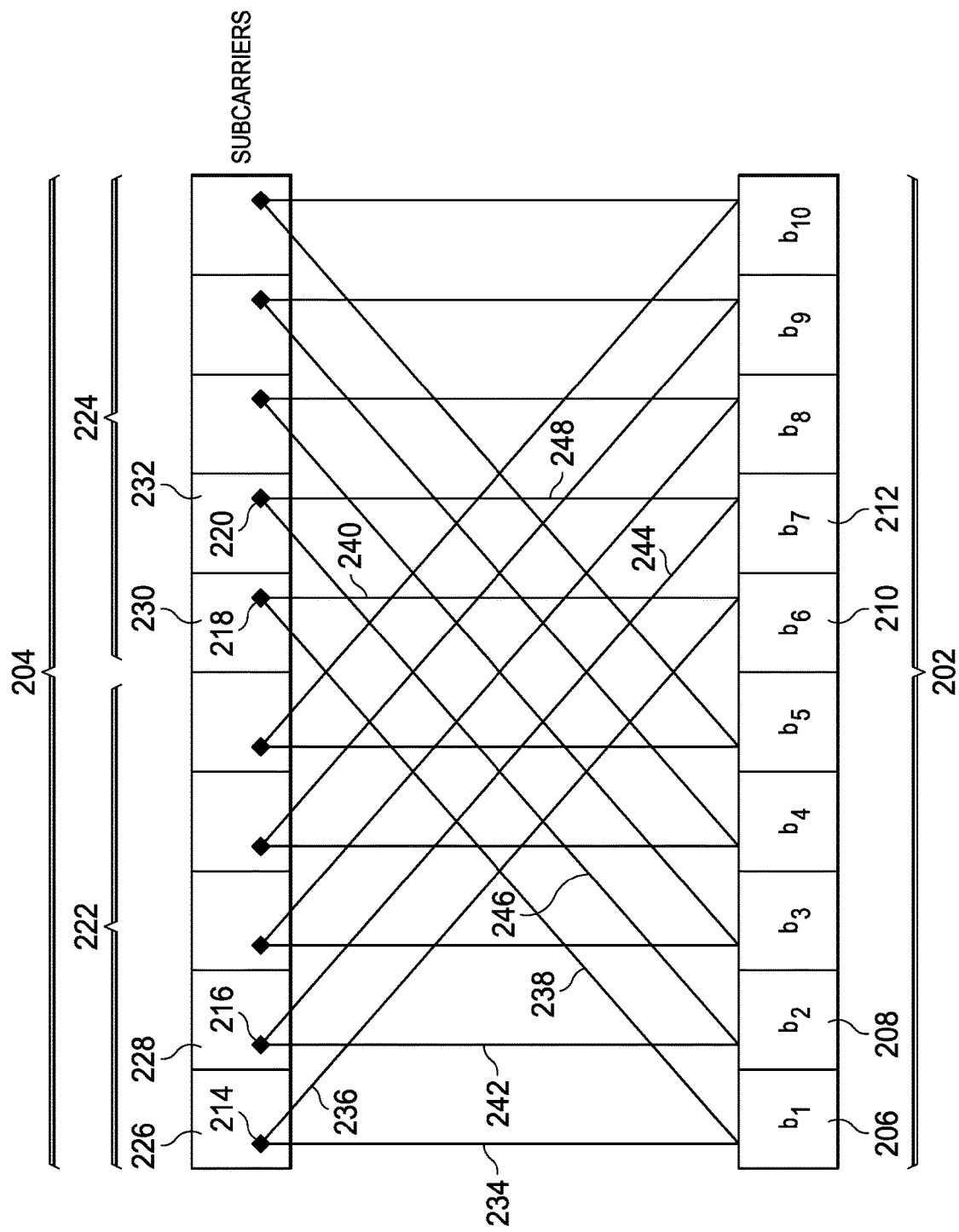
FIG. 2 illustrates a dual carrier modulation (DCM) scheme, in accordance with aspects of the present invention.

FIG. 2 illustrates a dual carrier modulation (DCM) scheme, in accordance with aspects of the present invention.

As shown in figure, the DCM scheme includes a bit stream 202 and a stream of symbols 204. Bit stream 202 includes a plurality of binary bits, examples of which are 206, 208, 210 and 212. Stream of symbols 204 includes a plurality of symbols, examples of which are 214, 216, 218 and 220. Stream of symbols 204 are assigned to sub-bands 222 and 224, each of which is divided into subcarriers, examples of which are 226, 228, 230 and 232.

The DCM scheme maps a group of bits to a symbol, which is assigned to a sub-band, examples of which are: bit 206 and bit 210 being mapped to symbol 214 as indicated by lines 234 and 236, respectively; bit 206 and bit 210 being mapped to symbol 218 as indicated by lines 238 and 240, respectively; bit 208 and bit 212 being mapped to symbol 216 as indicated by lines 242 and 244, respectively; and bit 208 and bit 212 being mapped to symbol 220 as indicated by lines 246 and 248, respectively.

It should be noted that in the example as shown in FIG. 2, only two bits are mapped to two symbols. However, as will be described later, in accordance with aspects of the present invention, M bits may be mapped to M symbols, wherein M is a positive integer.

In accordance with aspects of the present invention, the mapping of bits to symbols as described in FIG. 2 will be discussed in greater detail with reference to FIGS. 3A-5.

There exist a large number of possible symbol mappings, however, there are optimal symbol mappings that can be chosen to minimize the symbol error rate. Bits may be mapped to symbols by any known method, non-limiting examples of which include Phase-shift keying (PSK) and Amplitude and phase-shift keying or asymmetric phase-shift keying (APSK).

Example mappings for mapping three bits to three 8PSK symbols, in accordance with aspects of the present invention, will now be described in greater detail with reference to FIGS. 3A-B. This mapping may be optimal for a particular noise and channel condition.

Figure 3A:
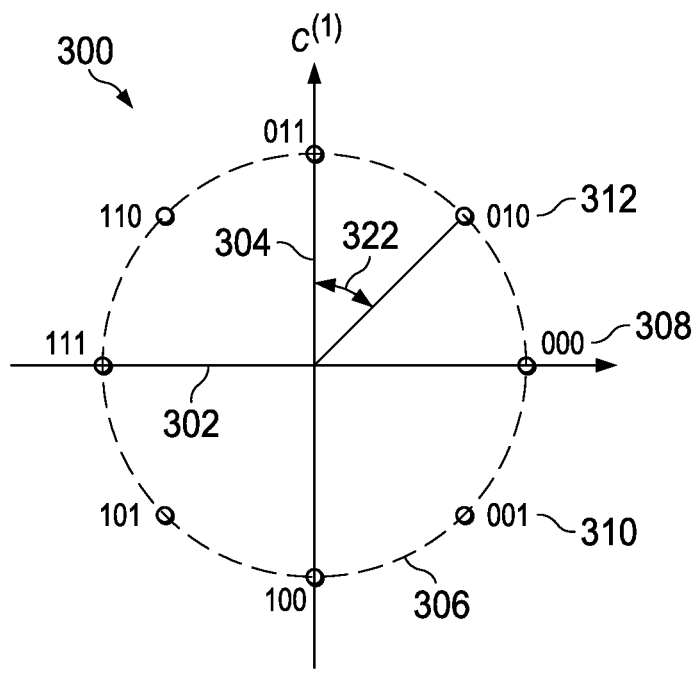
FIG. 3A illustrates an example of an 8PSK mapping constellation.

FIG. 3A illustrates an example of an 8PSK mapping constellation 300.

Phase-shift keying (PSK) is a digital modulation scheme that conveys data by changing, or modulating, the phase of a reference signal (the carrier wave). Any digital modulation scheme uses a finite number of distinct signals to represent digital data. PSK uses a finite number of phases, each assigned a unique pattern of binary digits. Usually, each phase encodes an equal number of bits. Each pattern of bits forms the symbol that is represented by the particular phase. The demodulator, which is designed specifically for the symbol-set used by the modulator, determines the phase of the received signal and maps it back to the symbol it represents, thus recovering the original data. This requires the receiver to be able to compare the phase of the received signal to a reference signal such a system is termed coherent (and referred to as CPSK) 8PSK is a PSK scheme that maps eight different digital words, i.e., three binary bits, to eight symbols.

As shown in the figure, constellation 300 has an x-axis 302, a y-axis 304 and a radius 306. The constellation allows mappings for 8 binary numbers, for example a bit stream 000 as indicated by 308 lies on radius 306 at phase angle 0°, a bit stream 001 as indicated by 310 lies on radius 306 at phase angle 315° and a bit stream 010 as indicated by 312 lies on radius 306 at phase angle 45°. The mappings are spaced around radius 306 at integer multiples of phase angle 322 which has a value of 45°.

A bit stream corresponds to the different bits that are mapped to a single symbol. For example, consider bit stream 001 as indicated by 310. For purposes of discussion, returning to FIG. 2, let the first bit value "1" in bit stream 001 correspond to bit 206, let the second bit value "0" in bit stream 001 correspond to bit 210, and let the third bit value "0" in bit stream 001 correspond to another bit (not shown), that is separated from bit 210. In this example, therefore, the symbol in constellation 300 that corresponds to bit stream 001 corresponds to the bit values of three separated bits in bit stream 202. Accordingly, information corresponding to a unit radius, in this example radius 306, and a specific phase, in this example 315°, sufficiently describes the values of three distinct bits in bit stream 202.

Then, consider bit stream 010 as indicated by 312. For purposes of discussion, returning to FIG. 2, let the first bit value "0" in bit stream 001 correspond to bit 208, let the second bit value "1" in bit stream 010 correspond to bit 212, and let the third bit value "0" in bit stream 010 correspond to another bit (not shown), that is separated from bit 212. In this example, therefore, the symbol in constellation 300 that corresponds to bit stream 010 corresponds to the bit values of three separated bits in bit stream 202. Accordingly, information corresponding to a unit radius, in this example radius 306, and a specific phase, in this example 45°, sufficiently describes the values of three distinct bits in bit stream 202.

This mapping continues until all bits within bit stream 202 are mapped to a symbol. In some embodiments, all mappings are performed to a single constellation. In some embodiments mappings may be performed to different constellations.

Figure 3B:
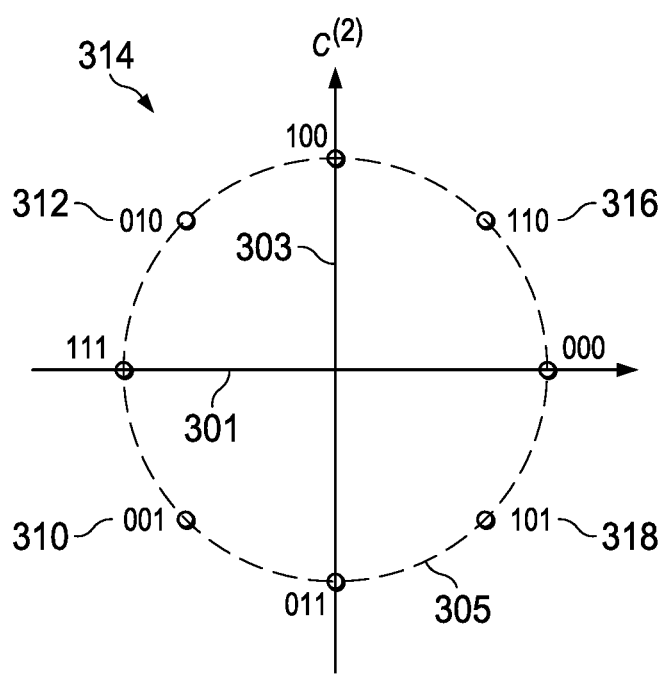
FIG. 3B illustrates another example of an 8PSK mapping constellation.

FIG. 3B illustrates another example of an 8PSK mapping constellation, 314.

As shown in the figure, constellation 314 has an x-axis 301, a y-axis 303 and a radius 305. The constellation allows mappings for 8 binary numbers, spaced around radius 305 at integer multiples of a phase angle of 45°.

Constellation 314 differs from constellation 300 in that values for the bit streams 001 indicated by 310, 010 indicated by 312, 110 indicated by 316 and 101 indicated by 318 have been mapped 225°, 135°, 45° and 315° respectively.

Consider now for example, a bit stream corresponds to the different bits that are mapped to a single symbol. For example, consider bit stream 001 as indicated by 310. For purposes of discussion, returning to FIG. 2, let the first bit value "1" in bit stream 001 correspond to bit 206, let the second bit value "0" in bit stream 001 correspond to bit 210, and let the third bit value "0" in bit stream 001 correspond to another bit (not shown), that is separated from bit 210. In this example, therefore, the symbol in constellation 300 that corresponds to bit stream 001 corresponds to the bit values of three separated bits in bit stream 202. Accordingly, information corresponding to a unit radius, in this example radius 306, and a specific phase, in this example 315°, sufficiently describes the values of three distinct bits in bit stream 202. Accordingly, as compared to constellation 300 of FIG. 3A, wherein bit stream 001 corresponded to a symbol associated with a phase of 315°, in constellation 314 of FIG. 3B, bit stream 001 corresponds to a symbol associated with a phase of 225°.

Then, consider bit stream 010 as indicated by 312. For purposes of discussion, returning to FIG. 2, let the first bit value "0" in bit stream 001 correspond to bit 208, let the second bit value "1" in bit stream 010 correspond to bit 212, and let the third bit value "0" in bit stream 010 correspond to another bit (not shown), that is separated from bit 212. In this example, therefore, the symbol in constellation 314 that corresponds to bit stream 010 corresponds to the bit values of three separated bits in bit stream 202. Accordingly, information corresponding to a unit radius, in this example radius 306, and a specific phase, in this example 135°, sufficiently describes the values of three distinct bits in bit stream 202. Accordingly, as compared to constellation 300 of FIG. 3A, wherein bit stream 010 corresponded to a symbol associated with a phase of 45°, in constellation 314 of FIG. 3B, bit stream 010 corresponds to a symbol associated with a phase of 135°.

In the non-limiting examples discussed above, bits may be mapped to symbols by a single constellation, or by a plurality of constellations. So long as a receiver has knowledge of the encoding scheme used by a transmitter, the receiver will be able to decode non-compromised data by any known manner or system.

The non-limiting example 8PSK mapping discussed above with reference to FIGS. 3A-B enable mapping of three binary bits to a single 8PSK symbol, of an 8-symbol set. However, aspects of the present invention may be applied to larger symbol sets.

Example mappings for mapping 4 bits to 4 16PSK constellations, in accordance with aspects of the present invention, will now be described in greater detail with reference to FIGS. 4A-B.

Example mappings for 16PSK constellations, in accordance with aspects of the present invention, will now be described in greater detail with reference to FIGS. 4A-B.

Figure 4A:
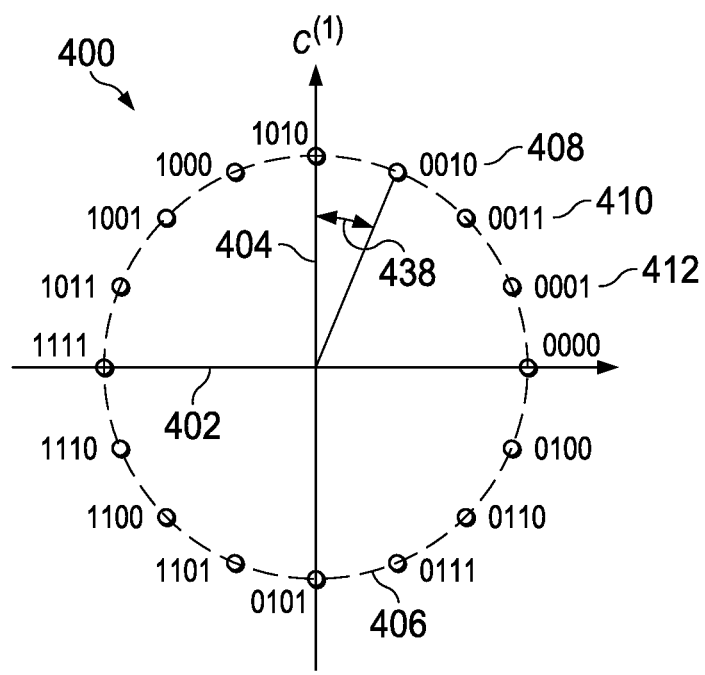
FIG. 4A illustrates an example 16PSK mapping constellation.

FIG. 4A illustrates an example 16PSK mapping constellation, 400.

As shown in the figure, constellation 400 has an x-axis 402, a y-axis 404 and a radius 406. Bit streams map to symbols at radius 406 at an integer multiple of a phase angle of 22.5°, example bit streams of which are labeled 408, 410 and 412. With constellation 400, 16 binary numbers, each of which consists of four binary bits, are mapped to 16 symbols, respectively. For example a bit stream 0010 as indicated by 408 lies on radius 406 at a phase angle of 67.5°, a bit stream 0011 as indicated by 410 lies on radius 406 at a phase angle of 45° and a bit stream 0001 as indicated by 412 lies on radius 406 at a phase angle of 22.5°.

With a 16PSK mapping constellation, four separated bits may be mapped to a single symbol. The mapping continues until all bits within a bit stream are mapped to a symbol. In some embodiments, all mappings are performed to a single constellation. In some embodiments mappings may be performed to different constellations.

Figure 4B:
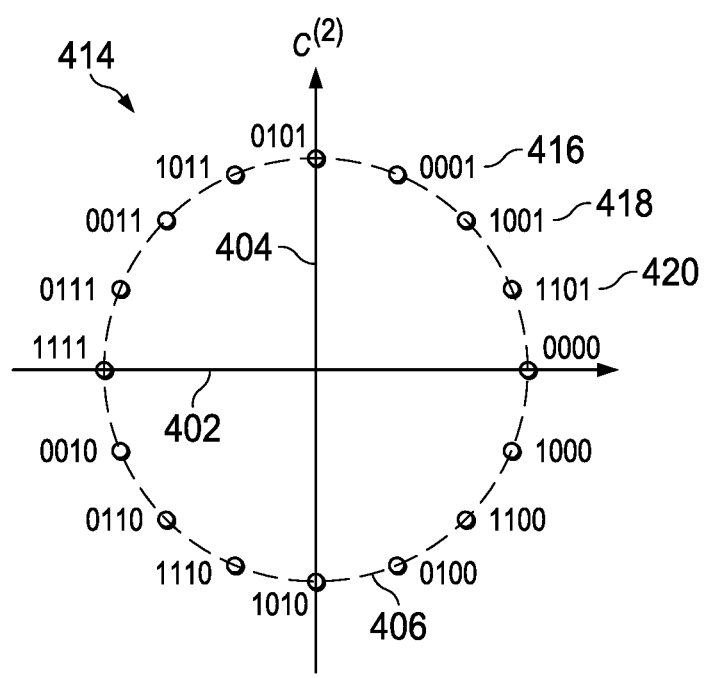
FIG. 4B illustrates another example 16PSK mapping constellation.

FIG. 4B illustrates another example 16PSK mapping constellation, 414.

As shown in the figure, constellation 414 has x-axis 402, y-axis 404 and radius 406. Bit streams map to symbols at radius 406 at an integer multiple of a phase angle of 22.5°, example bit streams of which are labeled 416, 418 and 620. With constellation 414, 16 binary numbers, each of which consists of four binary bits, are mapped to 16 symbols, respectively. For example a bit stream 0001 as indicated by 416 lies on radius 406 at a phase angle of 67.5°, a bit stream 1001 as indicated by 418 lies on radius 406 at a phase angle of 45° and a bit stream 1101 as indicated by 620 lies on radius 406 at a phase angle of 22.5°. As such, by comparing constellation 400 of FIG. 4A with constellation 414 of FIG. 4B, a symbol of a radius and a specific angle in constellation 400 corresponds to a different bit stream than a symbol of the same radius and the same specific angle in constellation 414. For example, bit stream 408 of constellation of 400 is different from bit stream 416 of constellation 414, even though each will have the same 16PSK symbol.

In the non-limiting examples discussed above, bits may be mapped to symbols by a single 16PSK constellation, or by a plurality of 16PSK constellations. So long as a receiver has knowledge of the encoding scheme used by a transmitter, the receiver will be able to decode non-compromised data by any known manner or system.

The non-limiting example 8PSK and 16PSK mapping discussed above with reference to FIGS. 3A-4B enable mapping of three binary bits to a single 8PSK symbol, of an 8-symbol set, and four binary bits to single 16PSK symbol, of a 16-symbol set, respectively. However, aspects of the present invention may be applied to larger symbol sets, by additionally addressing changes in amplitude of the symbol.

As mentioned above, as possible that at least one of the constellations could be an APSK constellation, an example of which will now be discussed in FIG. 5.

Figure 1:
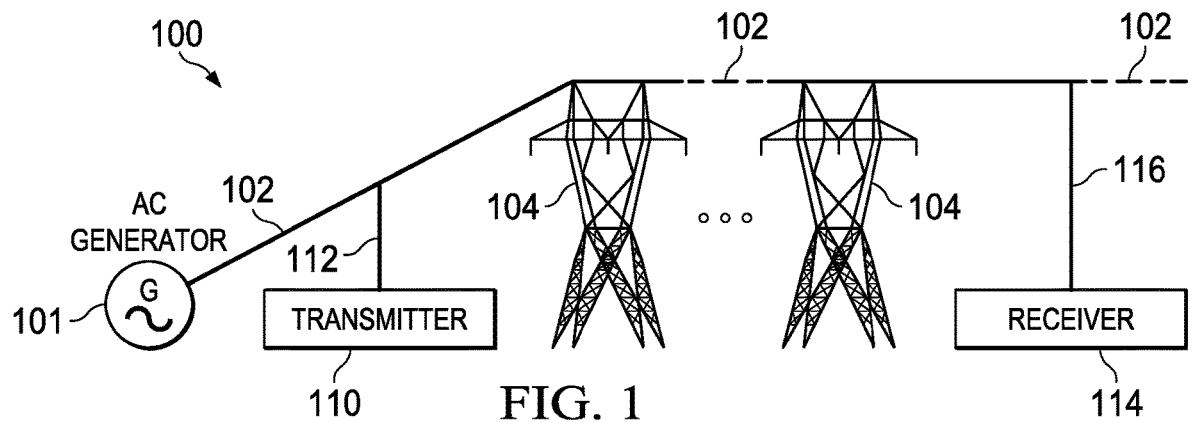
FIG. 1 illustrates a conventional power-line communications system.
Figure 5:
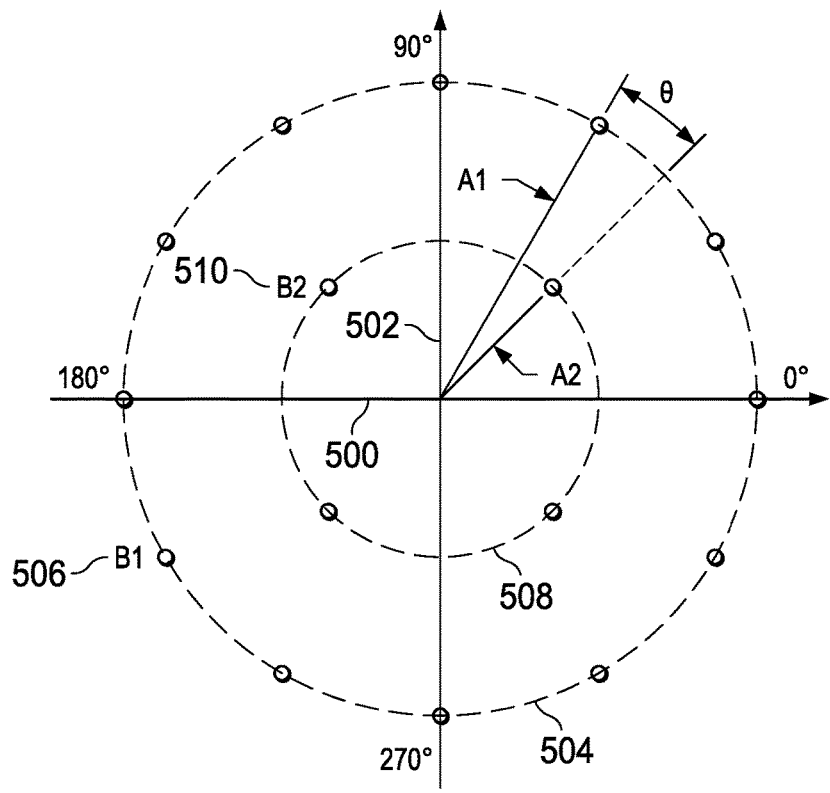
FIG. 5 illustrates an example of 16APSK mapping constellation.

FIG. 5 illustrates an example of 16APSK mapping constellation.

Amplitude and phase-shift keying or asymmetric phase-shift keying (APSK), is a PSK scheme that conveys data by changing, or modulating, both the amplitude and the phase of a reference signal (the carrier wave) in other words, it combines both amplitude-shift keying (ASK) with the phase-shift keying (PSK) to increase the symbol-set.

As shown in the figure, there is an x-axis 500, a y-axis 502, a radius 504 and a radius 508. The constellation allows mapping for 16 binary numbers to 16 symbols, examples of which are indicated by 506 and 510.

Bit streams map to symbols at radius 504 at an integer multiple of a phase angle of 30°, an example symbol of which is labeled 506. Other bit streams map to symbols at radius 508 at an integer multiple of a phase angle of 45°, an example symbol of which is labeled 510.

As compared to the 8PSK and 16PSK constellation mapping discussed above with reference to FIGS. 3A-4B, an APSK constellation, for example as discussed with reference to FIG. 5, enables differentiation between symbols additionally based on radius.

The non-limiting example 8PSK, 16PSK and APSK mapping discussed above with reference to FIGS. 3A-5 do not limit the scope of the invention, but are merely provided for purposes of discussion. It should be noted that any known mapping scheme may be used.

Returning to FIG. 2, as illustrated by lines 234 and 236, the DCM scheme maps bit 206 and bit 210 of bit stream 202 to a symbol 214, which is assigned to subcarrier 226 within sub-band 222. Further, as illustrated by lines 238 and 240, the DCM maps bit 206 and bit 210 to a symbol 218, which is assigned to subcarrier 230 within sub-band 224. In this example DCM scheme, two bits, for example bit 206 and bit 210, are mapped to two symbols, for example symbol 214 and symbol 218. Each symbol is assigned a different subcarrier, for example subcarrier 226 and subcarrier 230, respectively.

The DCM scheme transmits two symbols, examples of which are 214 and 218, over two subcarriers separated by a number of subcarriers in a way that they experience independent channel distortion and noise. As such, if symbol 214 were compromised in transmission as a result of channel impairments that are a function of channel frequency, it is less likely that symbol 218 will be compromised by similar channel impairments as the two symbols are transmitted through separated and distinct subcarriers, 226 and 230, respectively. This provides diversity and is used to improve communication system reliability.

The first aspect of the invention extends DCM to a generalized frequency diversity modulation (FDM) scheme. The FDM scheme divides the transmission band into several different sub-bands, for example 222 and 224. There could, however, be M sub-bands.

In general, the FDM scheme maps M bits to M symbols. The M symbols are then allocated to M subcarriers. Each subcarrier is located within one individual sub-band. For example two bits, 206 and 210, are each mapped to two different symbols, 214 and 218. Symbol 214 is located in sub-band 222 and symbol 218 is located in sub-band 224.

A second aspect of the invention extends the application of differential modulation after DCM and will now be discussed with respect to FIG. 6.

Figure 6:
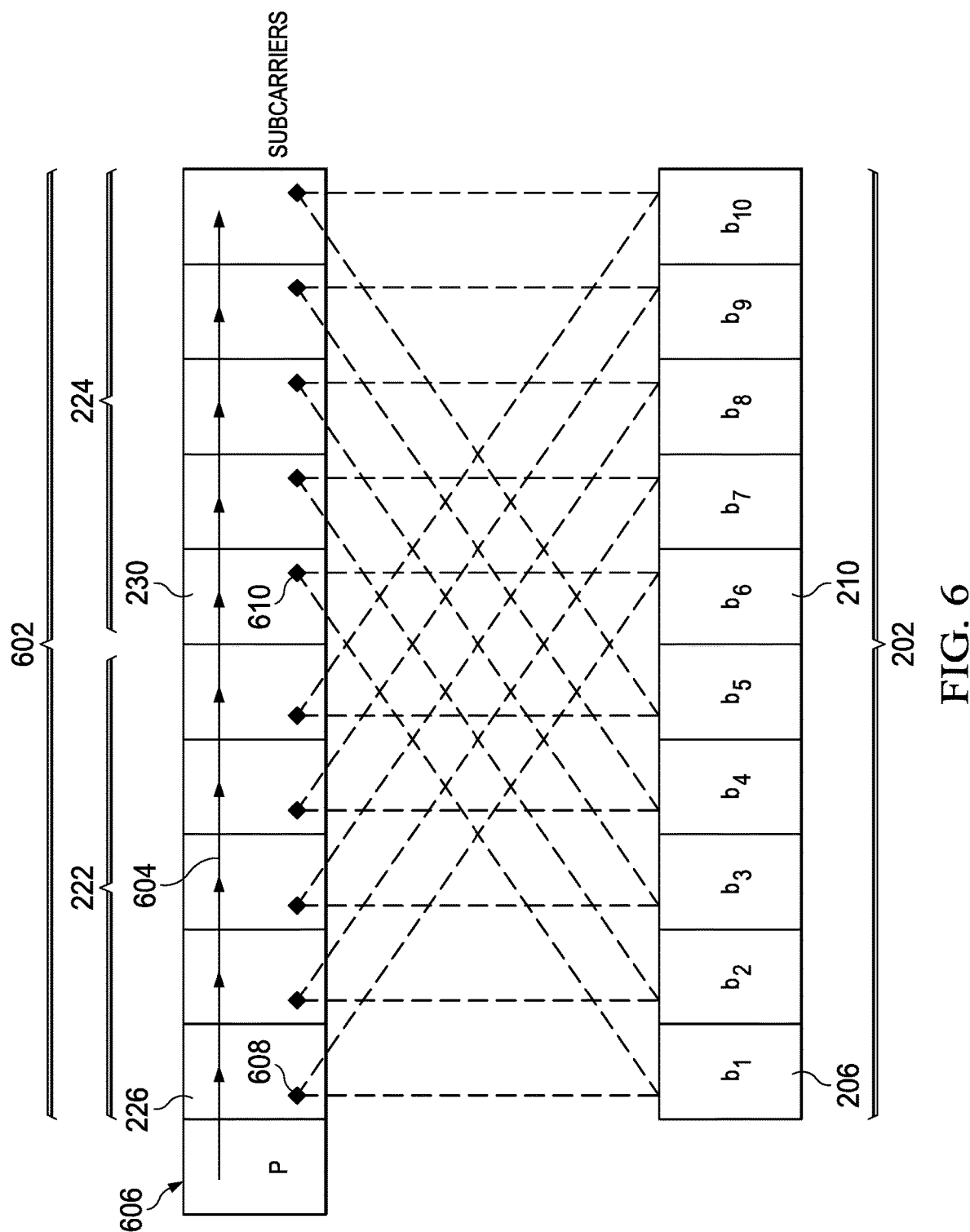
FIG. 6 illustrates a differential modulation scheme to be applied after DCM, in accordance with aspects of the present invention.

FIG. 6 illustrates a differential modulation scheme to be applied after DCM, in accordance with aspects of the present invention.

The figure shows a symbol stream 602 arranged in a differentially modulated scheme as indicated by arrows 604. Symbol stream 602 contains a pilot symbol 606 and differential symbols, examples of which are symbol 608 and symbol 610.

FIG. 6 shows differential modulation scheme 604 differentially modulates symbol 214 from subcarrier 226, shown in FIG. 2, with pilot symbol 606 resulting in differential symbol 608 contained in subcarrier 226. Subsequent differentially modulated symbols, for example differential symbol 610 in subcarrier 230, result as subcarriers in sub-bands 214 and 216 are differentially modulated based on the value contained in the previous subcarrier.

Differential modulation may occur in the frequency domain and the time domain using orthogonal frequency division multiplexing (OFDM) symbol streams. Each of the OFDM symbol streams contains several subcarriers. The first subcarrier of the OFDM symbol stream contains a pilot symbol. The next subcarrier is differentially modulated based on the value of the pilot symbol. Subsequent subcarriers are differentially modulated based on the value of the previous subcarrier resulting in the final OFDM symbol stream.

In an example embodiment of the present invention, subcarrier 226 containing symbol 214 discussed in FIG. 2, is differentially modulated with pilot symbol 606 resulting in differential symbol 608. Subsequent symbols are differentially modulated based on the value of the previous subcarrier resulting in symbol stream 602.

The differential modulation alleviates the receiver from the additional complexity for channel estimation. Since the data is encoded in the phase difference between two symbols, subtracting the phases of the two received symbols will automatically cancel the phase distortion, assuming that the channel remains approximately constant between the two symbols.

Both aspects of the invention, discussed above in FIGS. 2 and 6, will now be discussed in example embodiment of the present invention with respect to FIG. 7.

Figure 7:
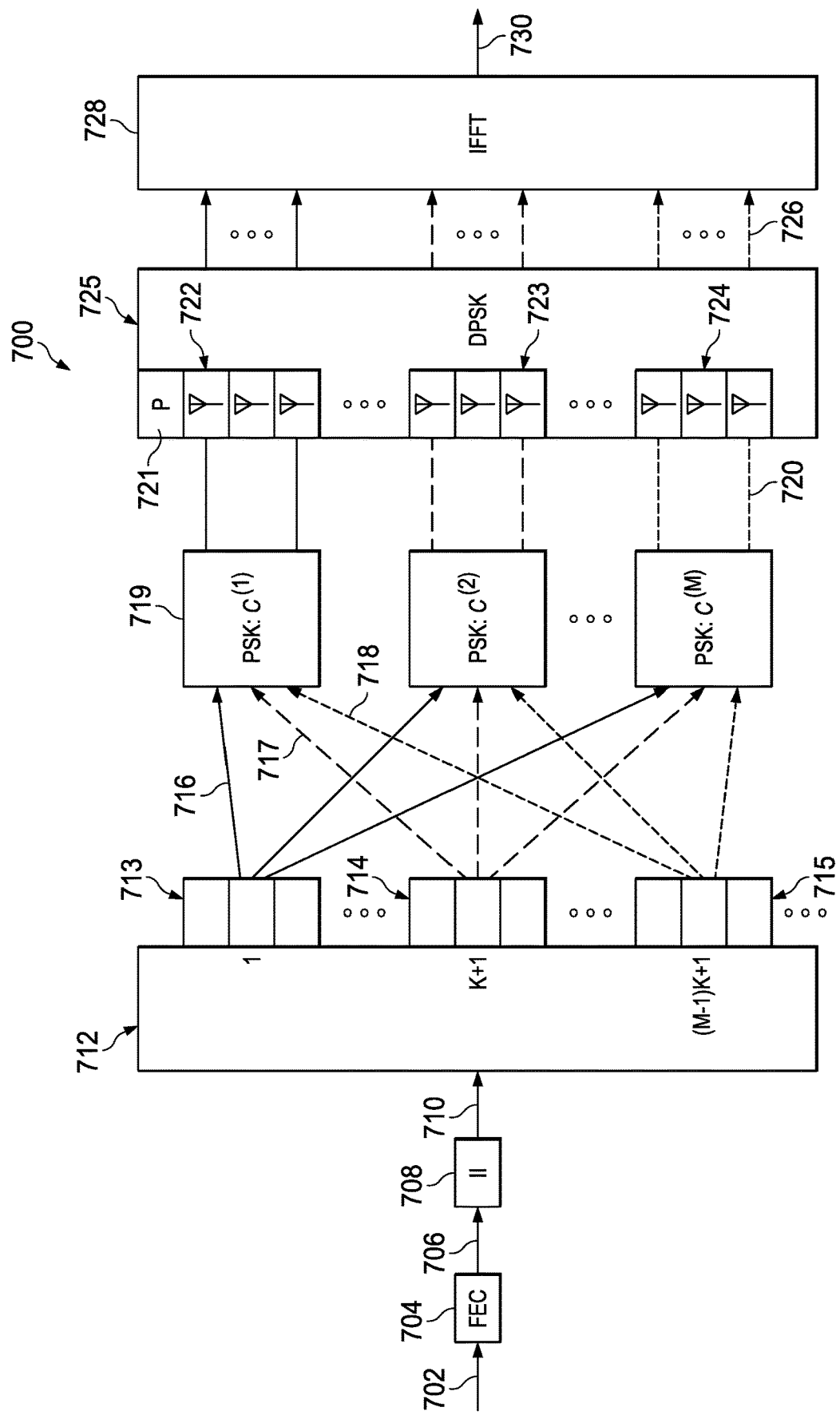
FIG. 7 illustrates an example of a differential encoding system in accordance with aspects of the present invention.

FIG. 7 illustrates an orthogonal frequency division multiplexing (OFDM) transmitter 700 using frequency diversity modulation (FDM), in accordance with aspects of the present invention.

As shown in the figure, transmitter 700 includes a bit stream 702, a forward error correcting (FEC) component 704, a bit interleave component 708, a mapping component 712, bits, examples of which are 713, 714 and 715, symbols, an example of which is 719, a differential encoder 725, a pilot symbol 721, differentially encoded sub-bands, examples of which are 722, 723 and 724, an OFDM symbol stream 726, an inverse fast Fourier transform (IFFT) component 728, a signal 730, mappings 716, 717 and 718, and communication channels 706, 710 and 720. Communication channels 706, 710 and 720 may be any known type of channel for transferring data, non-limiting examples of which include wired and wireless.

FEC component 704 connects to bit interleave component 708 by communication channel 706. Bit interleave component 708 is connected to mapping component 712 by communication channel 710. Symbol 719 is transmitted to differential encoder 725 by communication channel 720.

FEC component 704 and bit interleave component 708 are operable to protect binary information against burst errors prior to FDM. Mapping component 712 is operable to map bit 713, bit 714 and bit 715 to symbol 719 by mappings 716, 717 and 718, respectively. The bits are mapped to subsequent symbols in the same manner. Differential encoder 725 is operable to encode symbols, for example symbol 719 with pilot symbol 721, to produce differentially encoded symbols in sub-bands 722, 723 and 724 and generate OFDM symbol stream 726. IFFT component 728 is operable to generate signal 730.

The raw bit stream 702 is preconditioned to protect against burst errors FEC 704 and bit interleave component 708. Burst errors can result from compulsive noise contaminating consecutive bits in the bit stream 702. FEC component 704 performs forward error correction on the input bit stream. The bit interleave component 708 permutes bits throughout the bit stream and reduces error propagation.

In accordance with the first aspect of the present invention, as discussed above in FIG. 6, FDM is applied to the bit stream. Bits are mapped into sub-bands, examples of which are 713, 714 and 715, by mapping component 712 and allocated to symbols, an example of which is symbol 719, within each sub-band.

In accordance with the second aspect of the present invention, as discussed above in FIG. 6, the sub-bands are differentially modulated in the frequency domain. Differential encoder 725 differentially modulates the first symbol of sub-band 722 with pilot symbol 721. Subsequent symbols are differentially modulated using the value of the previous symbol resulting in sub-bands 722, 723 and 724, resulting in OFDM symbol stream 726.

The IFFT component 728 converts OFDM signal 726 from the frequency domain to the time domain resulting in signal 730.

In operation, bit stream 702 is preconditioned by FEC component 704 and bit interleave component 708 to minimize susceptibility of the data to burst errors. Mapping component 712 maps the individual bits to sub-bands, examples of which are 713, 714 and 715. Each bit is then mapped to a symbol in each sub-band, an example of which is 719. Differential encoder 725 differentially modulates the symbol stream containing the bitmapped symbols. Differential encoder 725 generates pilot symbol 721 and differentially modulates the first symbol of sub-band 722 with pilot symbol 721. Subsequent symbols from each sub-band are differentially modulated based on the value of the previous symbol, generating OFDM symbol stream 726. OFDM symbol stream 726 is transformed from the frequency domain to the time domain by IFFT component 728 resulting in signal 730.

Figure 8:
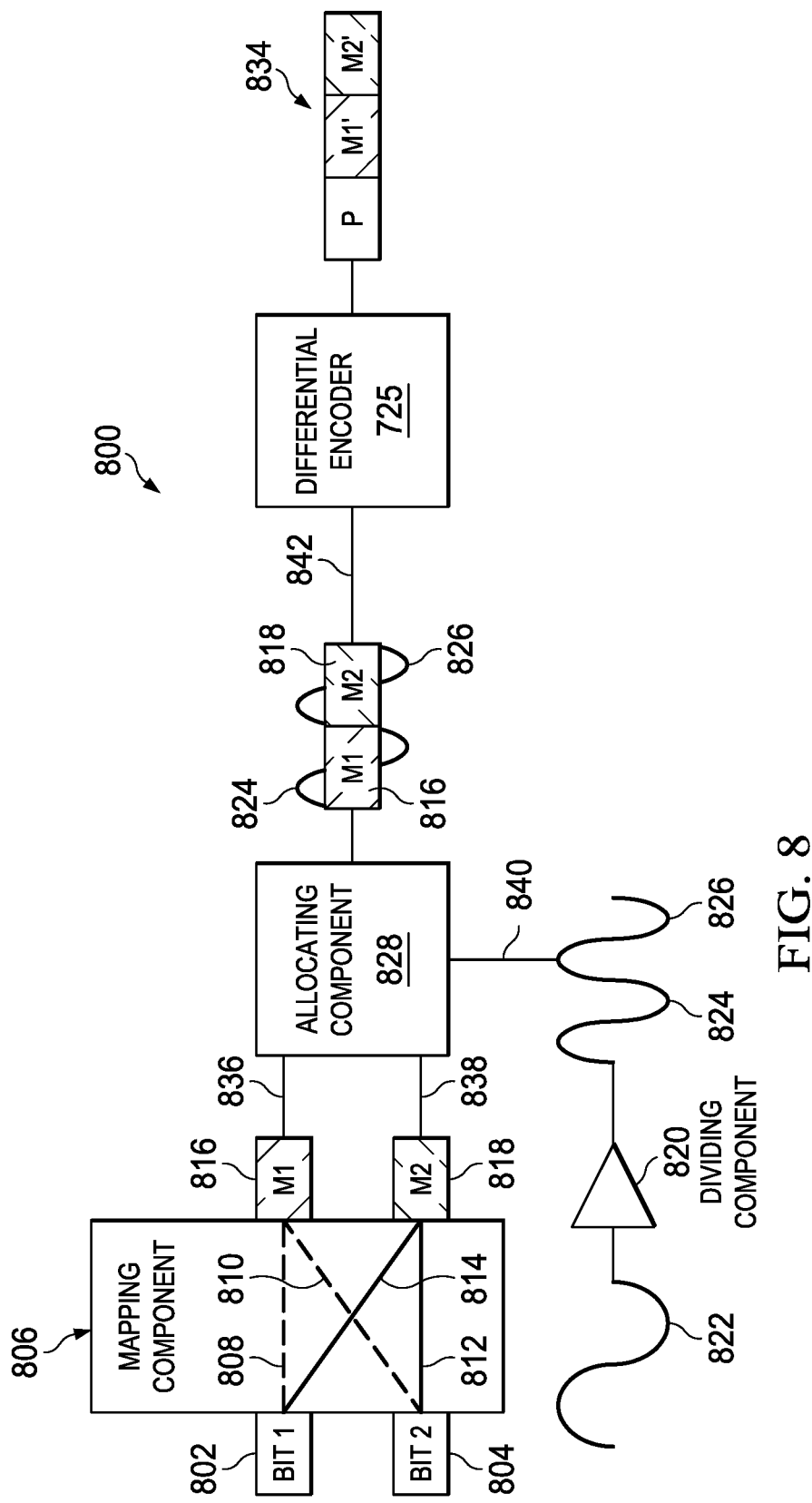
FIG. 8 illustrates an example orthogonal frequency division multiplexing (OFDM) transmitter using frequency diversity modulation (FDM), in accordance with aspects of the present invention.

FIG. 8 illustrates an example of a differential encoding system 800, in accordance with aspects of the present invention.

As shown in the figure, system 800 includes bit 802, bit 804, mapping component 806, mappings 808, 810, 812 and 814, symbol 816, symbol 818, allocating component 828, transmission band 822, dividing component 820, subcarriers 824 and 826, differential encoder 725 of FIG. 7, symbol stream 834 and communication channels 836, 838, 840 and 842. Communication channels 836, 838, 840 and 842 may be any known type of channel for transferring data, non-limiting examples of which include wired and wireless.

Mapping component 806 is connected to allocating component 828 by communication channel 836 and communication channel 838. Dividing component 820 is connected to allocating component 828 by communication channel 840. Allocating component 828 is connected to differential encoder 725 by communication channel 842.

Mapping component 806 is operable to encode bit 802 to symbol 816 by mapping 808 and to symbol 818 by mapping 814. Mapping component 806 is operable to encode bit 804 to symbol 816 by mapping 810 and to symbol 818 by mapping 812. Mapping component 806 is operable to transmit symbol 816 to allocating component 828 by communication channel 836. Mapping component 806 is operable to transmit symbol 818 to allocating component 828 by communication channel 838.

Dividing component 820 is operable to divide transmission band 822 into subcarrier 824 and subcarrier 826. Dividing component 820 is operable to transmit subcarrier 824 and subcarrier 826 to allocating component 828 by communication channel 840.

Allocating component 828 is operable to allocate symbol 816 to subcarrier 824 and symbol 818 to subcarrier 826 and transmit the encoded subcarriers to differential encoder 725 by communication channel 842.

Differential encoder 725 is operable to differentially encode symbol 816 and symbol 818. Differential encoder 725 is operable to produce symbol stream 834.

The first aspect of the present invention, which extends DCM to a general FDM scheme as described in FIGS. 2 and 6, will now be discussed.

Mapping component 806 maps bits 802 and 804 to symbol 816 in a first sub-band by mapping 808 and 814 respectively. Mapping component 806 also maps bits 802 and 804 to symbol 818 in a second sub-band by mapping 810 and 812 respectively.

Transmission band 822 is divided into two subcarriers 824 and 826 by dividing component 820. Allocating component 828 allocates symbol 816 to subcarrier 824 in the first sub-band and symbol 818 to subcarrier 826 in the second sub-band.

The second aspect of the present invention, which extends the application of differential modulation after DCM as discussed in FIGS. 2 and 6, is accomplished as differential encoder 725 encode the symbol stream containing symbols 816 and 818, resulting in symbol stream 834 and is described in greater detail in FIG. 8.

Differential encoder 725 will now be discussed in greater detail.

Figure 9:
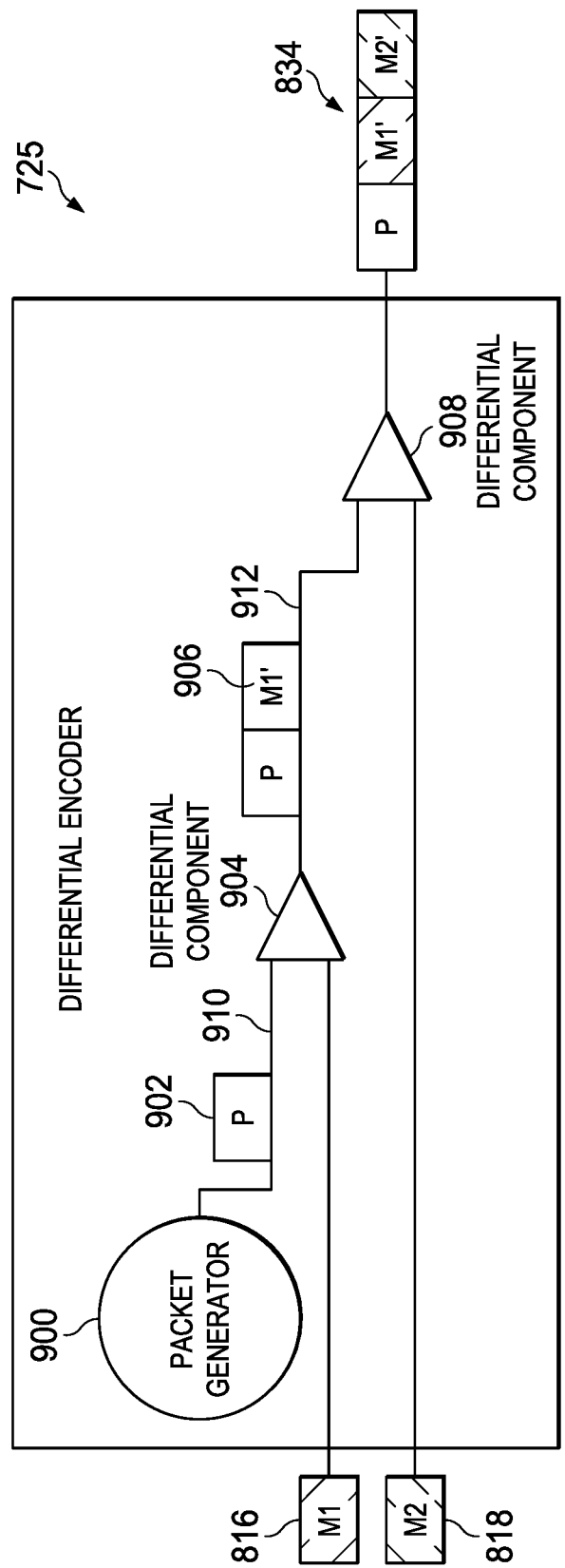
FIG. 9 illustrates an exploded view of an example implementation of the differential encoder of FIG. 8, in accordance with aspects of the present invention.

FIG. 9 illustrates an exploded view of an example implementation of differential encoder 725 as discussed above with reference to FIG. 8, in accordance with aspects of the present invention.

As shown in FIG. 9, differential encoder 725 includes symbol 816, symbol 818, packet generator 900, pilot symbol 902, differential component 904, differential component 908, symbol 906, communication channels 910 and 912, and symbol stream 834. Communication channels 910 and 912 may be any known type of channel for transferring data, non-limiting examples of which include wired and wireless.

Packet generator 900 is connected to differential component 904 by communication channel 910. Differential component 904 is connected to differential component 908 by communication channel 912.

Packet generator 900 is operable to produce pilot symbol 902 and transmit a signal to differential component 904 by communication channel 910. Differential component 904 is operable to differentially encode pilot symbol 902 and symbol 816 to produce symbol 906 and transmit symbol 906 to differential component 908 by communication channel 912. Differential component 908 is operable to differentially encode symbol 818 with symbol 906 to produce symbol stream 834.

Packet generator 900 generates pilot symbol 902. Differential component 904 differentially modulates symbol 816 with pilot symbol 902 resulting in symbol 906. Differential component 908 differentially modulates symbol 818 with symbol 906 resulting in symbol stream 834.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method comprising:
    receiving a bit stream;
    mapping a first bit of the bit stream into a first symbol;
    mapping the first bit of the bit stream into a second symbol;
    mapping a second bit of the bit stream into the first symbol;
    mapping the second bit of the bit stream into the second symbol;
    differentially encoding at least the first symbol and the second symbol; and
    causing the first and second symbols to be transmitted on a transmission band as part of a symbol stream.

2. The method of claim 1, comprising, prior to differentially encoding at least the first symbol and the second symbol:
    dividing the transmission band into sub-carriers;
    allocating the first symbol to a first sub-carrier of the sub-carriers; and
    allocating the second symbol to a second sub-carrier of the sub-carriers.

3. The method of claim 2, wherein:
    the transmission band includes at least a first sub-band and a second sub-band;
    the first sub-band includes a first plurality of the sub-carriers;
    the second sub-band includes a second plurality of the sub-carriers;
    the first sub-carrier is included in the first plurality of the sub-carriers and the second sub-carrier is included in the second plurality of the sub-carriers with the first plurality of the sub-carriers not overlapping with any of the second plurality of the sub-carriers;
    the first symbol allocated to the first sub-carrier is assigned to the first sub-band; and
    the second symbol allocated to the second sub-carrier is assigned to the second sub-band.

4. The method of claim 3, wherein no bit of the bit stream that is mapped to the first symbol is directly adjacent to any other bit of the bit stream that is mapped to the first symbol, and wherein no bit of the bit stream that is mapped to the second symbol is directly adjacent to any other bit of the bit stream that is mapped to the second symbol.

5. The method of claim 2, wherein the first sub-carrier and the second sub-carrier are separated on the transmission band by at least one other sub-carrier so that the first and second symbols are not directly adjacent to each other in the transmission band.

6. The method of claim 5, wherein differentially encoding at least the first and second symbols includes:
    generating a first differential symbol based on a difference between a pilot symbol and the first symbol using at least a first differential component, wherein the first differential symbol is contained in the first sub-carrier;
    for each of the at least one other sub-carriers, generating a respective differential symbol based on a difference between a symbol allocated to the sub-carrier and a differential symbol contained in an immediately preceding sub-carrier using the at least the first differential component, wherein the respective differential symbol is contained in the sub-carrier; and
    generating a second differential symbol based on a difference between the second symbol and a differential symbol contained in a sub-carrier immediately preceding the second sub-carrier, wherein the second differential symbol being contained in the second sub-carrier, the sub-carrier immediately preceding the second sub-carrier is one of the at least one other sub-carriers, and the symbol stream contains the pilot symbol, the first differential symbol, and the second differential symbol.

7. The method of claim 6, wherein the transmission band includes a plurality of sub-bands including a first sub-band and a second sub-band, the first sub-carrier containing the first differential symbol is in the first sub-band, and the second sub-carrier containing the second differential symbol is in the second sub-band.

8. The method of claim 1, wherein the first symbol includes the first bit, the second bit, and at least one additional bit of the bit stream, and the second symbol includes the first bit, the second bit, and the at least one additional bit.

9. The method of claim 1, wherein the first symbol includes the first bit, the second bit, and a third bit of the bit stream, and the second symbol includes the first bit, the second bit, and a fourth bit of the bit stream that differs from the third bit.

10. A system comprising:
    a processor;
    a receiver to receive a bit stream including a plurality of bits;
    a transmitter; and
    a memory to store instructions that, when executed by the processor:
        cause a first bit of the bit stream to be mapped into a first symbol;
        cause the first bit of the bit stream to be mapped into a second symbol;
        cause a second bit of the bit stream to be mapped into the first symbol;
        cause the second bit of the bit stream to be mapped into the second symbol;
        differentially encode the first symbol and the second symbol; and
        causing the first and second symbols to be transmitted as part of a symbol stream via the transmitter on a transmission band.

11. The system of claim 10, wherein dividing the transmission band includes a plurality of sub-carriers, and wherein the instructions, when executed by the processor:

cause the first symbol to be allocated to a first sub-carrier of the sub-carriers; and cause the second symbol to be allocated to a second sub-carrier of the sub-carriers.

12. The system of claim 11, wherein:

the transmission band includes at least a first sub-band and a second sub-band;

the first sub-band includes a first plurality of the sub-carriers;

the second sub-band includes a second plurality of the sub-carriers;

the first sub-carrier is included in the first plurality of the sub-carriers and the second sub-carrier is included in the second plurality of the sub-carriers with the first plurality of the sub-carriers not overlapping with any of the second plurality of the sub-carriers;

the first symbol allocated to the first sub-carrier is assigned to the first sub-band; and the second symbol allocated to the second sub-carrier is assigned to the second sub-band.

13. The system of claim 12, wherein no bit of the bit stream that is mapped to the first symbol is directly adjacent to any other bit of the bit stream that is mapped to the first symbol, and wherein no bit of the bit stream that is mapped to the second symbol is directly adjacent to any other bit of the bit stream that is mapped to the second symbol.

14. The system of claim 11, wherein the first sub-carrier and the second sub-carrier are separated on the transmission band by at least one other sub-carrier so that the first and second symbols are not directly adjacent to each other in the transmission band.

15. The system of claim 10, wherein the first symbol is one of a phase-shift keying (PSK) symbol or an amplitude and phase-shift keying (APSK) symbol.

16. The system of claim 10, wherein the first and second bits are not adjacent bits in the bit stream.

* * * * *